United States Patent

[11] 3,613,502

| [72] | Inventor | Hans O. Wagner<br>Dusseldorf-Lohausen, Germany |
|---|---|---|
| [21] | Appl. No. | 811,435 |
| [22] | Filed | Mar. 28, 1969 |
| [45] | Patented | Oct. 19, 1971 |
| [73] | Assignee | Schiess Aktiengesellschaft<br>Dusseldorf-Oberkassel, Germany |
| [32] | Priority | Mar. 30, 1968 |
| [33] | | Germany |
| [31] | | P 17 52 082.0 |

[54] VERTICAL BORING MILL
5 Claims, 10 Drawing Figs.

[52] U.S. Cl. ........................................ 90/14,
 90/15, 77/4
[51] Int. Cl. ........................................ B23c 3/04
[50] Field of Search .......................... 90/15, 16,
 20, 11, 14, 15.1; 77/4; 82/2.4

[56] References Cited
UNITED STATES PATENTS

| 3,286,324 | 11/1966 | Hautau ........................ | 90/15 UX |
| 3,137,207 | 6/1964 | Berthiez ...................... | 77/4 X |
| 3,168,851 | 2/1965 | Deflandre .................... | 90/11 |
| 3,460,435 | 8/1969 | Hucks et al. ................ | 90/15 |

*Primary Examiner*—Gil Weidenfeld
*Attorney*—Walter Becker

ABSTRACT: A vertical boring mill, especially for machining large containers, in which the face plate or chuck means is rotatably arranged in a pit while outside said pit and in diametrically opposite arrangement to each other there are provided two guiding bed means each carrying a bed carriage which in their turn support the opposite ends of a transverse beam supporting a vertically displaceable tool carriage, said bed carriages being adapted to displace the transverse beam in the direction of its longitudinal extension, and said guiding bed means being adapted to move said transverse beam in the direction transverse to the longitudinal extension of said transverse beam.

INVENTOR
Hans O. Wagner annular nozzle

INVENTOR
Hans O. Wagner
By

VERTICAL BORING MILL

The present invention relates to a vertical boring mill. The machining of large work pieces is frequently carried out on two-stand vertical boring mills which comprise primarily a face plate or chuck for receiving the work piece, two stands arranged laterally of said face plate or chuck and interconnected at the top by a transverse, and a transverse beam which is adjustable as to height on said stands while at least one tool slide is displaceably arranged on said adjustable transverse beam. Frequently, also additional carriages are required on one or both sides below said transverse beam and are displaceable in a vertical direction.

With all vertical rolling mills, the distance of the stands from the turning center of the face plate or chuck, the distance of the stands from each other, and the maximum height of the transverse beam above the plane of the face plate or chuck determine the maximum dimensions of the work piece. Particularly in connection with construction of large containers the height of the container is sometimes such that the maximum adjusting height of the transverse beam is not sufficient. In such instances, special machines are required the stands of which have a particularly great height. Such machines, however, require a considerably heavier construction because of the necessary bending resistance.

In order to be able to keep the height of the stands as low as possible, it is known to arrange the face plate or chuck below the floor which means in a pit provided between the stands so that the stands do not have to exceed an admissible height, while nevertheless the distance between the transverse beam and the face plate or chuck is increased to the required extent. When very large work pieces are involved, as for instance large containers which have to be machined on the inside and on the outside, it is desirable that the total space above the face plate or chuck be freed at least temporarily to permit mounting of the large container from the top onto the chuck. During this mounting the transverse beam between the stands should not be above the chuck. This makes it necessary that the stands can be laterally displaced to a corresponding extent. Such an arrangement, will, when high stands are involved, cause considerable difficulties aside from the fact that the transverse beams of such machines have such a great weight that a displacement of such transverse beams as to height requires considerable forces and also makes it necessary that the stands have a corresponding strength.

It is, therefore, an object of the present invention to provide an improved vertical boring mill of the general type involved, especially for machining the outside and inside of large containers, in which the base with the face plate or chuck is provided below the floor in a pit while on both sides of said pit a guiding bed is provided and above said pit a transverse beam extends transversely with regard to said guiding bed and while a tool slide is displaceable on said transverse beam.

More specifically, it is an object of the present invention to provide a vertical boring mill as set forth in the preceding paragraph which will not require high stands for the transverse beam while the transverse beam may have a particularly large cross section to prevent bending thereof while permitting a precise arresting of the parts with regard to each other and assuring a high bending resistance of the parts.

These and other objects and advantages of the invention will appear more clearly from the following specification in connection with the accompanying drawings, in which.

FIGS. 4 to 7 diagrammatically illustrate in different sections the drive for the vertical carriage of the boring mill according to the invention and the slides on said vertical carriage.

Figure 1:
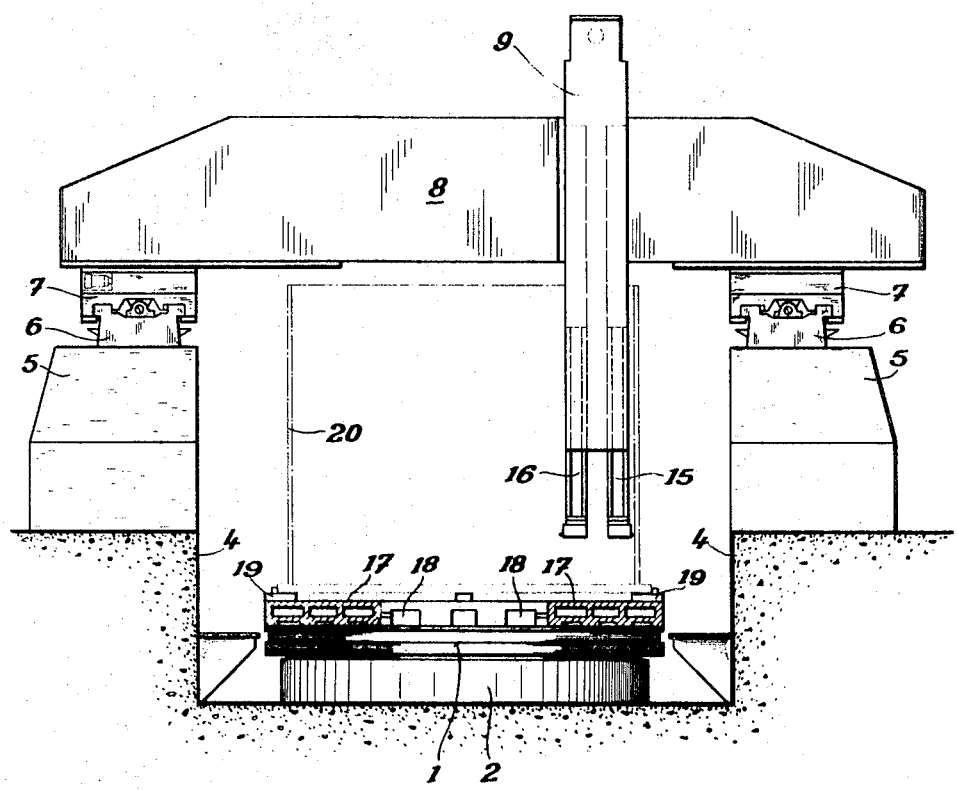
FIG. 1 is diagrammatically illustrates a vertical boring mill according to the invention with the face plate or chuck arranged below the floor.
Figure 2:
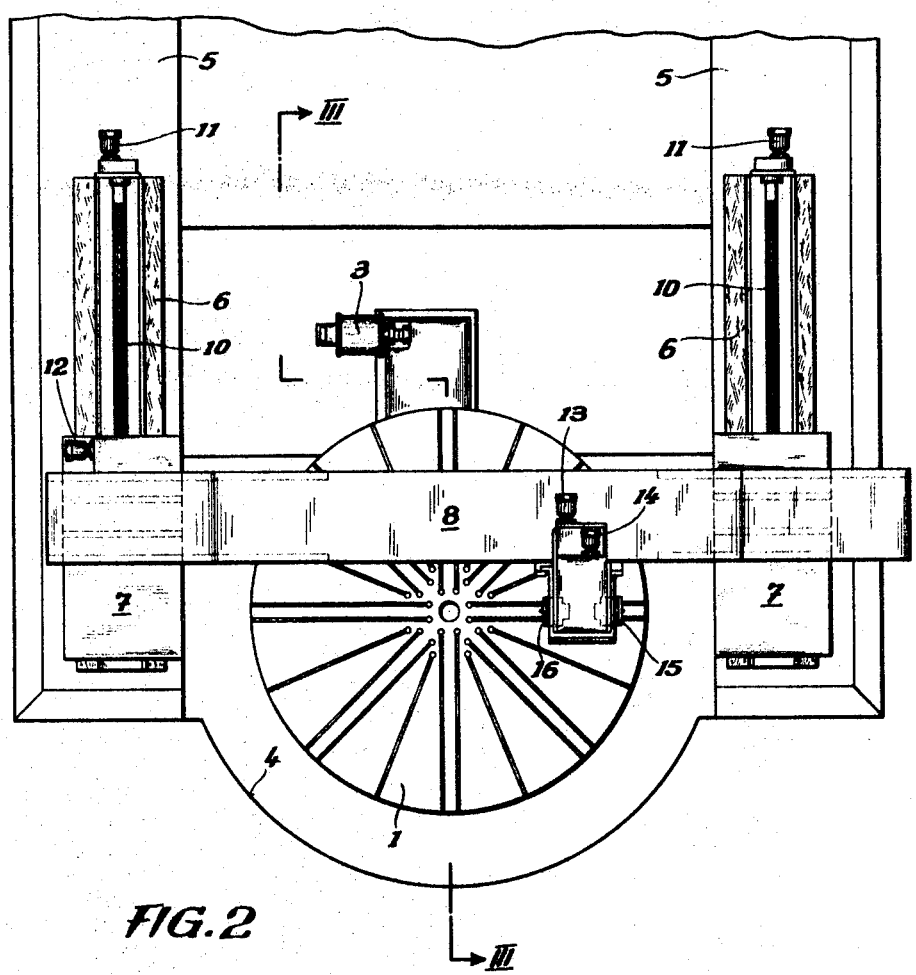
FIG. 2 is a diagrammatic top view of the boring mill of FIG. 1.
Figure 3:
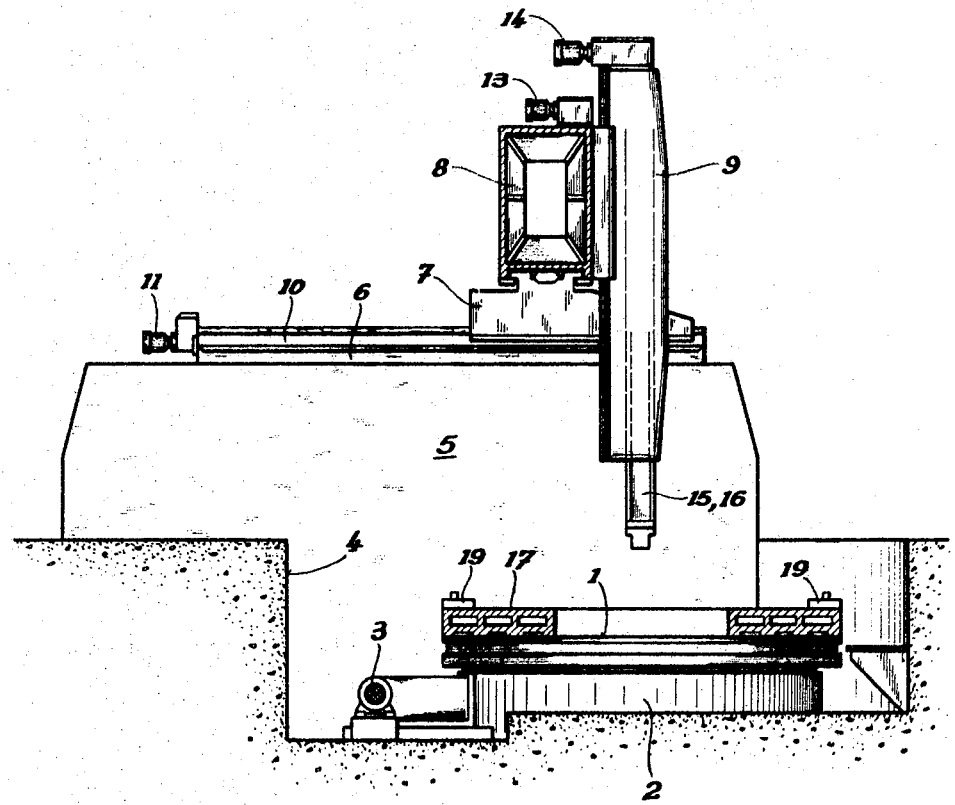
FIG. 3 represents a section taken along the line III—III of FIG. 2.
Figure 8:
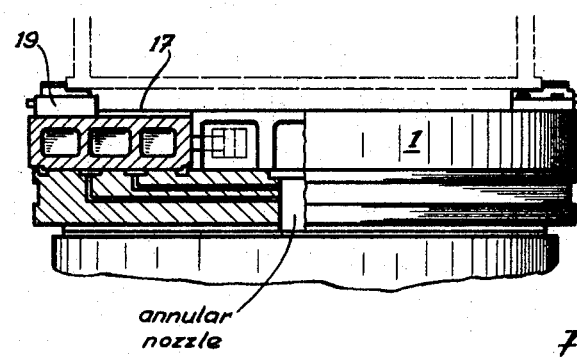

FIG. 8 illustrates partly in vertical section and partly in view the face plate or chuck but on a larger scale than FIGS. 1–3.

Figure 9:
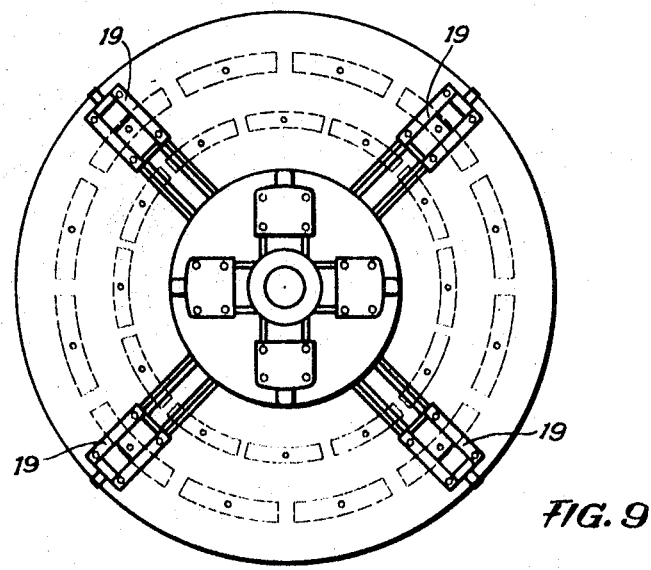

FIG. 9 is a top view of FIG. 8.

Figure 10:
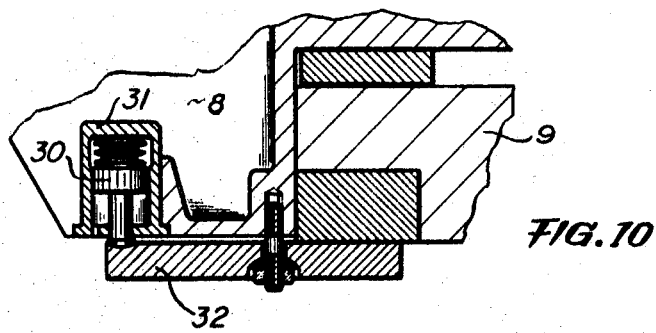

FIG. 10 shows arresting means for use in connection with the vertical carriage.

The vertical boring mill according to the present invention is characterized primarily in that one bed carriage each is respectively displaceable on the guiding beds and is arrestable thereon, and is furthermore characterized in that the transverse beam is displaceably supported by the bed carriages and arrestable on at least one of them while the tool carriage is vertically displaceable on the transverse beam and is arrestable thereon.

Thus, in conformity with the present invention, stands as supports for the transverse beam have been eliminated. They have been replaced by guiding beds which extend over a certain length in both sides of the pit and which are not subjected to bending stresses under the load of the transverse beam. In this way, it is assured that the guiding beds can absorb the weight of a very heavy transverse beam as such heavy beam may be necessary when the width of the pit is very great for receiving, for instance, a large container. Furthermore, according to the present invention, it is no longer necessary to make the tool carriage longitudinally displaceable on the transverse beam. Instead, it is merely necessary that the tool support is displaceable in vertical direction so that the supporting conditions of the tool carriage on the transverse beam are improved and the tool carriage can be made more torsion resistant. Instead of making the tool support displaceable in longitudinal direction of the transverse beam, the present invention provides that the transverse beam as such is displaceable in its longitudinal direction so as to be able to change the position of the tool carriage with regard to the axis of rotation of the chuck in such a way that by means of the tools of the tool carriage it will be possible to machine a work piece from the outside to the center of the chuck and to do this from the inside as well as from the outside. The machining of the work piece over its height is effected by vertically displacing the tool carriage and by additionally in the same direction displacing the tool slide in said carriage.

The machining possibilities may, according to the present invention, be furthermore improved by equipping the tool carriage with two vertically displaceable tool slides of which, for instance, one carries a radially outwardly directed tool, whereas the second slide carries a radially inwardly directed tool. Of these tools, the first one is intended for the machining in the inside whereas the second tool is intended for the machining of the outside, for instance, the wall of a large container. For milling the inner bottom side of a large container, both slides may be employed.

As will be seen from the drawings, the face or chuck 1 is with its bed 2 and its drive 3 (FIG. 2) arranged in a pit 4 while on opposite sides of said pit there is provided a concrete block 5 each. The drive for the check 3 may be of any conventional type, or may be similar to that shown in U. S. Pat. No. 3,318,195. Each of said blocks 5 carries a guiding bed 6. A bed carriage 7 is supported by each of said guiding beds 6 and to form a cross-slide or compound slide. The bed carriages 7 serve for supporting the transverse beam 8 which is displaceable on the bed carriages in the longitudinal direction of said transverse beam by about half the diameter of the face plate or chuck 1. It will thus be assured that the transverse beam 8 is displaceable transversely to its longitudinal direction on the guiding beds 6 along the pit 4 and is at the same time also displaceable in its longitudinal direction transverse thereto so that in this way the tool carriage 9 can be moved to the respective machining positions.

The tool carriage 9 on the transverse beam 8 is displaceable on said transverse beam in vertical direction only and can be arrested thereon in any desired position, e.g., hydraulically by piston 30 in cylinder 31 through member 32 engaging tool carriage 9, as illustrated in FIG. 10. Similar arresting possibilities exist for the transverse beam 8 and the bed carriages 7 and for the latter and the guiding beds 6. The bed carriages 7 are displaceable on the guiding paths of the guiding beds 6 by means of threaded spindles 10 which extend in longitudinal direction in the guiding beds 6 and are adapted to be driven by motors 11. The displacement of the transverse beam 8 in its longitudinal direction is connected to the beam by any conventional mechanism, such as threaded spindles similar to spindles 10 actuating carriages 7.

Figure 4:
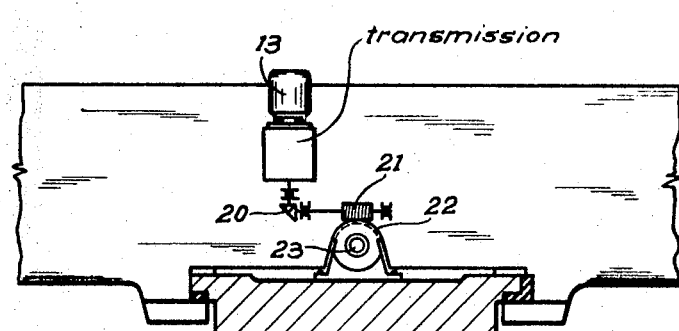
Figure 5:
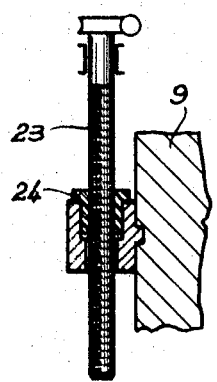
Figure 6:
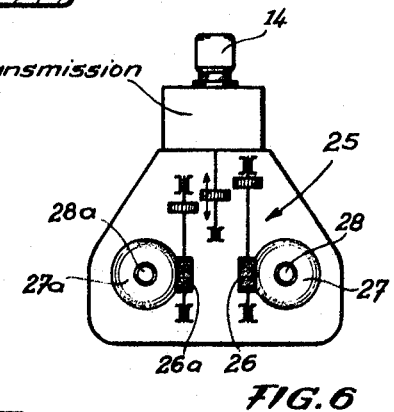
Figure 7:
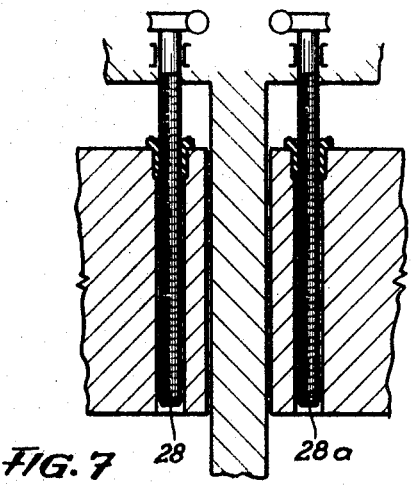

For purposes of adjusting the tool carriage 9 as to height, the transverse beam 8 is provided with a motor 13, while the driving connection of motor 13 with carriage 9 may be effected in any desired manner, e.g., in the manner shown in FIG. 4, namely through bevel gears 20, a worm 21, a worm wheel 22 which rotates a spindle 23 meshing with a nut 24 which is fixedly connected to carriage 9. Furthermore, there is provided a drive motor 14 by means of which the two slides 15 and 16 on the tool carriage 9 may be vertically displaced. More specifically, by means of a motor 14 it is possible through the intervention of a variable transmission 25, worms 26, 26a and worm wheels 27, 27a to respectively drive spindles 28, 28a to thereby displace slides 15 and 16 in the manner described in connection with FIG. 5.

For chucking and aligning large and heavy work pieces, for instance, a large container 20 indicated in FIG. 1 by dot-dash lines, the chuck 1 has connected thereto a mounting or clamping ring 17 which comprises a number of hydraulically operable relieving cushions for lifting the entire ring 17. By means of aligning supports 18 connected to the face plate or chuck 1 it is possible hydraulically to displace the ring 17. In this way, the work piece 20 arranged on the chuck 1 and clamped fast by means of clamping jaws 19 (FIG. 9) can be radially and axially precisely aligned without employing great force.

As will be seen from the drawings, the tool slides 15 and 16 afford the possibility of machining the container from the inside and from the outside. When machining the vertical wall of the container, merely the respective tool slide, in case of machining the inside of the container the tool slide 15, or when machining the outside of the container, the tool slide 16 is moved upwardly or downwardly during the machining operation. The tool carriage 9 is at the start moved into such a position that the tool slide 15 or 16 is supported as far as possible over its entire machining path whereby it is realized that the tool slides 15 and 16 are moved out of the tool carriage as little as possible and consequently cannot bend through.

The way in which the transverse beam 8 is supported and the possibility of arresting the same on the bed carriage 7 together with the support and arresting of the bed carriage 7 on the guiding paths of the guiding beds 6 assures a torsion resistant system so that lack of machining precision in view of distortion of machine parts is practically eliminated in contrast to heretofore known vertical boring mills which have stands of considerable height and in which the tool carriage is displaceable in transverse direction and the transverse beam is displaceable as to height so that with each movement different bending moments occur the resultant of which can not or can only under difficulties be mastered. In contrast thereto, with the arrangement of the present invention, it is merely to be taken into consideration that possibly the slide 15 or 16 might bend slightly, but this can be compensated for, for instance, by a corresponding camber or decline.

Thus, the present invention provides a vertical boring mill which is suitable in particular for the machining of large containers and which those parts which absorb the tensioning forces support each other and are connected to each other in such a way that no material deforming forces can occur.

It is, of course, to be understood that in the present invention is, by no means, limited to the particular showing in the drawings but also comprises any modifications within the scope of the appended claims.

What I claim is:

1. In a vertical boring mill, especially for machining the inside and outside of large containers, in which chuck means are rotatably supported on a bed for receiving and supporting a work piece, two parallel guiding bed means arranged at diametrically opposite sides of said bed in vertically spaced relationship to said chuck means and laterally outwardly of the vertical upward projection of said chuck means, two bed carriage means movably mounted on said guiding bed means, a transverse beam supported by said two bed carriage means and movable longitudinally of said transverse beam, said bed carriage means being movable in a direction transverse to the longitudinal direction of said transverse beam along said guiding bed means, and tool carriage means supported by said transverse beam and displaceable vertically toward and away from said chuck means.

2. In a vertical boring mill as claimed in claim 1, in which said guiding bed means extend beyond the said bed and chuck means, and said transverse beam is movable by said bed carriage means on said guiding bed means from above said chuck to a position laterally beyond said chuck, so that a work piece may be placed on or removed from said chuck.

3. A vertical boring mill according to claim 1, which includes motor means supported by said transverse beam and drivingly connected to said tool carriage means for effecting the vertical movement thereof.

4. A vertical boring mill according to claim 1, which includes two tool slides vertically movably arranged on said tool carriage means for selectively and individually movable toward and away from said chuck means.

5. A vertical boring mill according to claim 1, which includes driving means mounted on said tool carriage means and drivingly connected to said tool slides for actuating the same.